United States Patent
Shepherd et al.

(10) Patent No.: US 7,145,745 B1
(45) Date of Patent: Dec. 5, 2006

(54) MULTI-STAGE ACTUATOR DISK DRIVES, METHODS, AND COMPUTER PROGRAM PRODUCTS THAT COMPENSATE FOR REPEATABLE RUNOUT BASED ON ESTIMATED SECONDARY ACTUATOR POSITION

(75) Inventors: Stan Shepherd, Morgan Hill, CA (US); Jason Adler, Fremont, CA (US); Lin Guo, Milpitas, CA (US); Xiaoping Hu, Milpitas, CA (US); Yu Sun, Fremont, CA (US)

(73) Assignee: Maxtor Corporation, Longmont, CO (US)

( * ) Notice: Subject to any disclaimer, the term of this patent is extended or adjusted under 35 U.S.C. 154(b) by 104 days.

(21) Appl. No.: 10/932,717

(22) Filed: Sep. 2, 2004

Related U.S. Application Data

(60) Provisional application No. 60/560,827, filed on Apr. 8, 2004.

(51) Int. Cl.
*G11B 5/596* (2006.01)
(52) U.S. Cl. ................... 360/77.04; 360/78.05
(58) Field of Classification Search ............ None
See application file for complete search history.

(56) References Cited

U.S. PATENT DOCUMENTS

| | | | |
|---|---|---|---|
| 5,550,685 A | 8/1996 | Drouin ................. | 360/77.08 |
| 6,504,668 B1 * | 1/2003 | Takeuchi et al. ......... | 360/77.04 |
| 6,549,362 B1 | 4/2003 | Melrose .................. | 360/77.04 |
| 6,721,124 B1 | 4/2004 | Chang et al. ............ | 360/78.05 |
| 2005/0146807 A1 * | 7/2005 | Huang et al. ............ | 360/78.05 |

* cited by examiner

*Primary Examiner*—Andrew L. Sniezek
(74) *Attorney, Agent, or Firm*—Myers Bigel Sibley & Sajovec, PA

(57) ABSTRACT

Methods of compensating for repeatable runout in a disk drive are provided. The disk drive includes a data storage disk, a transducer adjacent to the disk, a primary actuator for positioning the transducer over a first range of movement, and a secondary actuator for positioning the transducer over a second range of movement that is less than the first range of movement. Estimates are made of the position of the secondary actuator in the second range of movement. Data is read from the disk via the transducer. A position error signal is determined based on the read data. Positioning of the transducer by the primary actuator is controlled based on the estimated position of the secondary actuator in the second range of movement and based on the position error signal to compensate for repeatable runout.

11 Claims, 5 Drawing Sheets

MULTI-STAGE ACTUATOR DISK DRIVES, METHODS, AND COMPUTER PROGRAM PRODUCTS THAT COMPENSATE FOR REPEATABLE RUNOUT BASED ON ESTIMATED SECONDARY ACTUATOR POSITION

RELATED APPLICATION

This application claims the benefit of and priority to U.S. Provisional Patent Application Ser. No. 60/560,827, filed Apr. 8, 2004, and entitled "MODIFIED ADAPTIVE REPEATABLE RUNOUT CANCELLATION SCHEME WITH DUAL-STAGE SERVO SYSTEM USING ESTIMATED VCM PES", the disclosure of which is hereby incorporated herein by reference as if set forth in its entirety.

FIELD OF THE INVENTION

The present invention relates to disk drives and, more particularly, to methods, apparatus, and computer program products for transducer positioning in disk drives.

BACKGROUND OF THE INVENTION

Computer disk drives store information on disks or platters. Typically, the information is stored on each disk in concentric tracks. The data tracks are usually divided into sectors. Information is written to and read from a storage surface(s) of a disk by a transducer. The transducer may include a read element separate from a write element, or the read and write elements may be integrated into a single read/write element. The transducer is mounted on an actuator arm capable of moving the transducer radially over the disk. Accordingly, the movement of the actuator arm allows the transducer to access different data tracks. The disk is rotated by a spindle motor at a high speed, allowing the transducer to access different sectors within each track on the disk.

The actuator arm is coupled to a motor or coarse actuator, such as a voice coil motor (VCM), to move the actuator arm such that the transducer moves radially over the disk. Operation of the coarse actuator is controlled by a servo control system. The servo control system generally performs two distinct functions: seek control and track following. The seek control function includes controllably moving the actuator arm such that the transducer is moved from an initial position to a target track position. In general, the seek function is initiated when a host computer associated with the computer disk drive issues a command to read data from or write data to a target track on the disk. Once the transducer has been moved sufficiently close to the target track by the seek function of the control system, the track following function of the servo control system is activated to center and maintain the transducer on the target track until the desired data transfers are completed.

The track following function of the servo control system generally includes maintaining the transducer at a desired position with respect to a track being followed (e.g., over a centerline of the track). Typically, the transducer must be moved slightly during track following to maintain a desired position over the track. This is because, due to various factors, the track may appear to move beneath the transducer. There are numerous outside influences which can make it difficult for the servo control system to maintain the desired position over the track, one such influence is known as "runout."

Runout generally refers to deviation from perfect circular motion and, more particularly, refers to variation in the distance between an external point of reference and a passing surface of a rotating object. "Repeatable runout" involves periodic deviations that occur with predictable regularity (hereafter "RRO"). "Nonrepeatable runout" involves random perturbations due, for example, to bearing slop, shock events, and so on (hereafter NRRO). In the context of a disk drive, RRO is "repeatable" because it occurs in sync with the spinning disk. RRO may be caused by one or more of the following mechanical sources: a) spindle motor runout; b) disk slippage; c) disk warping; d) disturbances converted to RRO during the Servo Writing process due to, for example, NRRO, vibrations, resonances, media defects, or disk distortion due to clamping of the HDA. RRO may also be caused by electromagnetic imperfections due to low quality servo bursts, even if they were mechanically recorded on the ideal circle. Such low quality servo bursts can yield incorrect position information.

The ability to precisely position a transducer with respect to a track being followed has become increasingly important, as data and track densities in hard disk drives have increased. In particular, the space between adjacent tracks has become increasingly small, and the tracks themselves have become increasingly narrow. In order to increase the precision with which a transducer may be positioned with respect to a track during track following, an articulated actuator arm may be used. In general, the angle of the distal portion, or second stage, of the actuator arm with respect to the main portion, or first stage, of the actuator arm is controlled by a microactuator. By operating the microactuator to introduce small changes in the position of the transducer with respect to a track being followed, the accuracy of track following operations may be increased. However, because of the relatively small range of motion provided by microactuators, their range of motion is easily saturated. Accordingly, microactuators can become saturated during track following due to RRO, which may make it more difficult for the servo control system to maintaining the transducer at a desired position with respect to the track being followed.

SUMMARY OF THE INVENTION

Some embodiments of the present invention provide methods of compensating for repeatable runout in a disk drive. The disk drive includes a data storage disk, a transducer adjacent to the disk, a primary actuator for positioning the transducer over a first range of movement, and a secondary actuator for positioning the transducer over a second range of movement that is less than the first range of movement. Estimates are made of the position of the secondary actuator in the second range of movement. Data is read from the disk via the transducer. A position error signal is determined based on the read data. Positioning of the transducer by the primary actuator is controlled based on the estimated position of the secondary actuator in the second range of movement and based on the position error signal to compensate for repeatable runout. The primary actuator may be configured to coarsely position the actuator, and the secondary transducer may be configured to finely position the transducer.

In some further embodiments of the present invention, repeatable runout is determined for at least one track on the disk, a repeatable runout compensation signal is generated based on the determined repeatable runout, and positioning of the transducer by the primary actuator is controlled based on the repeatable runout compensation signal and based on the position error signal to compensate for repeatable runout. Position of the transducer may be further controlled based on the estimated position of the secondary actuator in the second range of movement.

In some other embodiments of the present invention, a disk drive includes a data storage disk, a transducer, a primary actuator, a secondary actuator, and controller. The transducer is configured to read data from the disk. The primary actuator is configured to position the transducer relative to the disk over a first range of movement. The secondary actuator is configured to position the transducer over a second range of movement that is less than the first range of movement. The controller is configured to control positioning of the transducer by the primary actuator and the secondary actuator, configured to estimate position of the secondary actuator in the second range of movement, configured to determine a position error signal based on data read by the transducer, and configured to control positioning of the transducer by the primary actuator based on the estimated position of the secondary actuator in the second range of movement and based on the position error signal to compensate for repeatable runout.

In some further embodiments of the present invention, the primary actuator is configured to coarsely position the transducer, and may be a voice coil motor. The secondary actuator is configured to finely position the transducer, and may be a microactuator. The controller is configured to determine repeatable runout for at least one track on the disk, configured to generate a repeatable runout compensation signal based on the determined repeatable runout, and configured to control positioning of the transducer by the primary actuator based on the repeatable runout compensation signal and based on the position error signal to compensate for repeatable runout. The controller may be further configured to control positioning of the transducer based on the estimated position of the secondary actuator in the second range of movement to compensate for repeatable runout.

Some other embodiments of the present invention provide a computer program product for compensating for repeatable runout in a disk drive. The disk drive includes a data storage disk, a transducer adjacent to the disk, a primary actuator for coarsely positioning the transducer over a first range of movement, and a secondary actuator for finely positioning the transducer over a second range of movement that is less than the first range of movement. The computer program product includes computer program code embodied in a computer-readable storage medium, and that is configured to estimate position of the secondary actuator in the second range of movement, and configured to control positioning of the transducer by the primary actuator based on the estimated position of the secondary actuator in the second range of movement and based on a position error signal to compensate for repeatable runout.

In some further embodiments of the present invention, the computer program product further includes computer program code that is configured to determine repeatable runout for at least one track on the disk, computer program code that is configured to generate a repeatable runout compensation signal based on the determined repeatable runout, and computer program code that is configured to control positioning of the transducer by the primary actuator based on the repeatable runout compensation signal, based on the position error signal, and based on the estimated position of the secondary actuator in the second range of movement to compensate for repeatable runout.

DETAILED DESCRIPTION OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items.

The present invention may be embodied as disk drives, methods, and/or computer program products. Accordingly, the present invention may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example a portable computer diskette, a random access memory (RAM), a read-only memory (ROM), an erasable programmable read-only memory (EPROM or Flash memory), an optical fiber, and a portable compact disk read-only memory (CD-ROM).

The present invention is described below with reference to block diagrams, including operational flow charts, of disk drives, methods, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
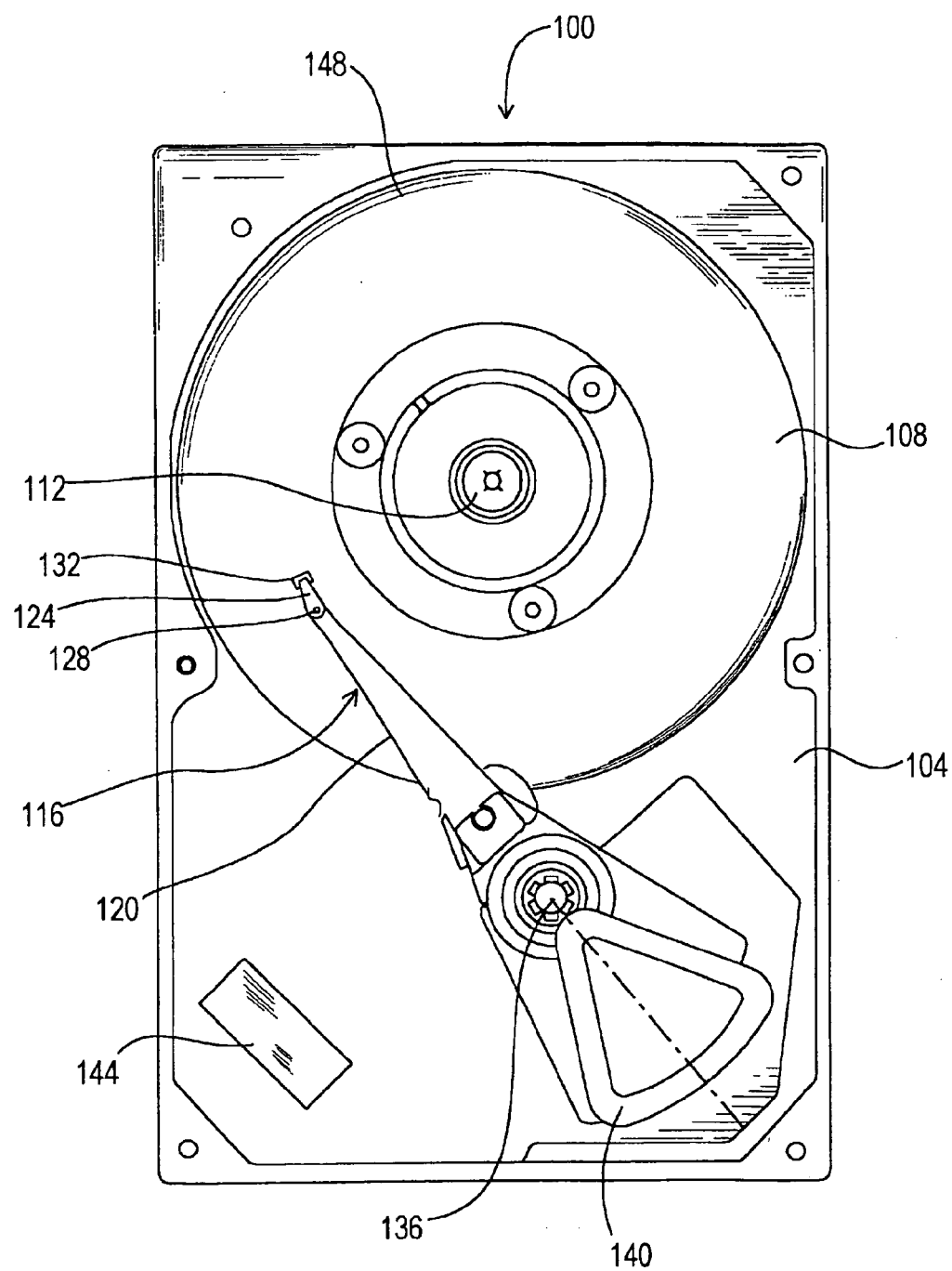
FIG. 1 is a diagrammatic representation of a disk drive having dual actuators and a controller configured to compensate for RRO according to some embodiments of the present invention.

FIG. 1 illustrates a computer disk drive with a dual stage actuator. The disk drive, generally identified by reference number 100, includes a base 104 and one or more data storage disks 108 (only one of which is shown in FIG. 1). The disks 108 may be magnetic disks, optical disks, or any other type of data storage disks, and which may have data storage tracks defined on one or both of its storage surfaces. The disks 108 are interconnected to the base 104 by a spindle motor (not shown) mounted within or beneath the hub 112, such that the disks 108 can be rotated relative to the base 104.

Actuator arm assemblies 116 (only one of which is shown in FIG. 1), include a first member 120 and a second member 124. The first member 120 is coupled between the base 104 and the second member 124, and the members 120 and 124 can provide two stages of movement. Interconnecting the first stage 120 and the second stage 124 of the actuator arm assemblies 116 are microactuators 128 (only one of which is shown in FIG. 1). Transducers 132 (only one of which is illustrated in FIG. 1) are mounted on a distal portion of the actuator arm assemblies 116. In particular, the transducers 132 can be coupled to an end of the second member 124 of the actuator arm assembly 116.

The first member 120 of the actuator arm assemblies 116 can be interconnected to the base 104 by a bearing 136. A coarse actuator 140 can pivot the actuator arm assembly 116 about the bearing 136 to radially position the transducers 132 with respect to the magnetic disks 108. In particular, the coarse actuator 140 positions the transducers 132 to allow them to access different data tracks or cylinders 148 on the magnetic disks 108. The coarse actuator 140 is operated by a controller 144. The coarse actuator 140 may be a voice coil motor, a linear motor, or any other mechanism for positioning the actuator arm assemblies 116, and in particular the transducers 132, with respect to the data tracks 148 on the magnetic disks 108.

The controller 144 is configured to operate the microactuator 128 to make fine adjustments in the radial position of the transducers 132 with respect to the magnetic disks 108. The microactuator 128 may be any mechanism capable of moving the transducer 132 over a range of movement, such as by adjusting the second member 124 of the actuator arm assemblies 116 with respect to the first member 120. For example, the microactuator 128 may be a piezoelectric actuator, an electromagnetic actuator, or an electrostatic actuator. Accordingly, the coarse actuator 140 may more coarsely position the transducer 132 compared to the finer positioning that can be provided by the microactuator 128. The microactuator 128 may be used primary, or exclusively, to assist with positioning the transducer 132 during track following. Consequently, the microactuator 128 may be configured to have a range of movement that can be less than a width of a track, yet sufficiently large to enable transducer 128 positioning that can be needed during track following.

The articulation of the second member 124 with respect to the first member 120 of the actuator arm assemblies 116 may be achieved by, for example, providing a journal bearing as part of the microactuator 128, by providing a flexible interconnection between the second member 124 and the first member 120, or by otherwise joining the second member 124 to the first member 120 in such a way that the second member 124 is allowed to move with respect to the first member 120.

The controller 144 can be configured to control the coarse actuator 140 and the microactuator 124 during track following to attempt to maintain the transducer 132 at a desired position with respect to a track being followed. The controller 144 can determine a position of the transducer 132 relative to a track based on a position error signal that is generated by the transducer 132 by, for example, servo patterns along the tracks 148, as is well known in the art. The microactuators 128 can be well-suited to effecting high frequency movements of the transducers 132 within its range of movement (i.e., over relatively short distances), such as that which may be encountered during track following. However, because of repeatable runout (RRO), the microactuators 128 may move in and out of saturation during attempts to move the transducer 132 beyond its range of movement. Accordingly, moving the transducer 132 by a combined control of the coarse actuator 140 and the microactuator 124 by the controller 144 may be needed, but may be made more difficult by RRO.

As will be discussed further below, the controller 144 is configured to estimate position of the microactuator 124 in its range of movement, and to control positioning of the transducer 132 by the coarse actuator 140 based on the estimated position of the microactuator 124 and based on the position error signal to compensate for RRO. The controller can compensate for RRO by, for example, determining RRO for at least one track on the disk, generating a RRO compensation signal based on the determined RRO, and controlling positioning of the transducer 132 by the coarse actuator 140 based on the RRO compensation signal.

Figure 2:
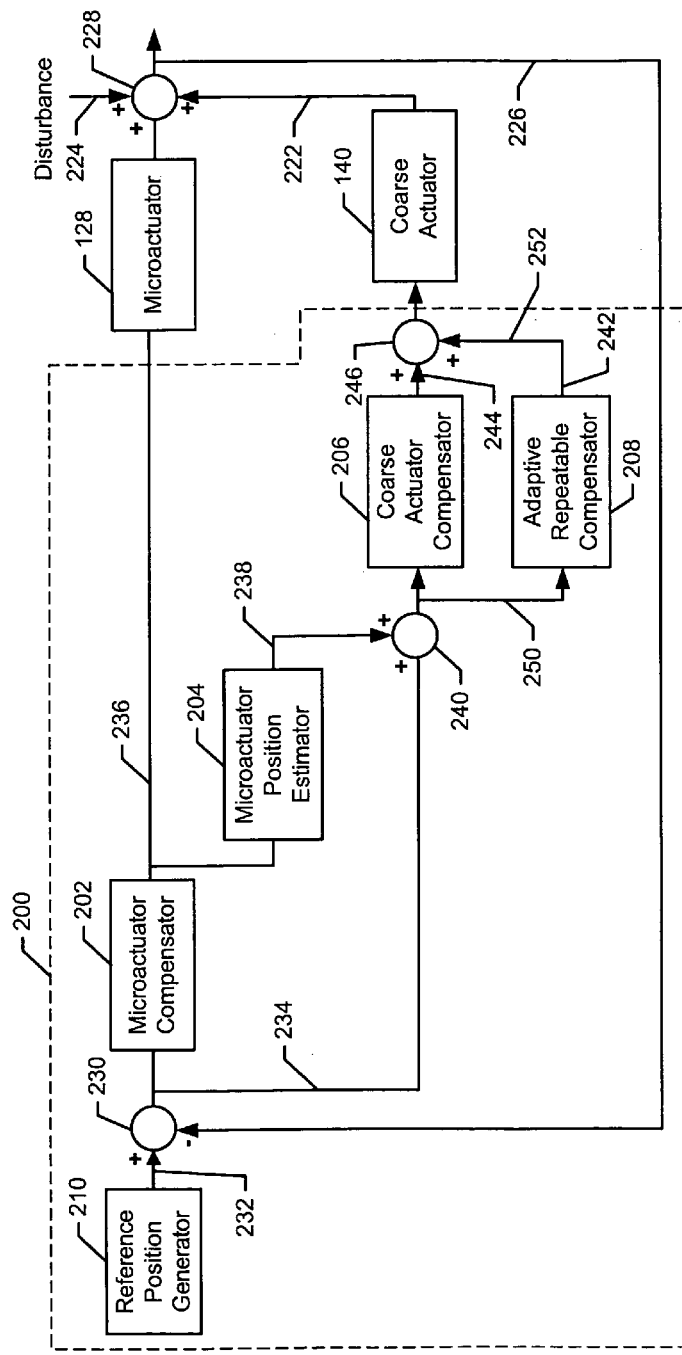
FIG. 2 is a block diagram of a microactuator, a coarse actuator, and a controller configured to compensate for RRO according to some embodiments of the present invention.

Referring now to FIG. 2, a controller 200 is coupled to the microactuator 128 and the coarse actuator 140 and configured in accordance with various embodiments of the present invention. The controller 200 may, for example, be included within the controller 144 shown in FIG. 1. The controller 200 includes a microactuator compensator 202, a microactuator position estimator 204, a coarse actuator compensator 206, an adaptive repeatable compensator 208, and a reference position generator 210.

As illustrated, the position of the transducer 132 relative to a track can depend on a summation, performed at summing node 228, of the transducer positioning contributions 220 and 222 by the microactuator 128 and the coarse actuator 140, and based on disturbances 224. The disturbances 224 can include RRO and non-repeatable runout (e.g., aperiodic external shocks). The controller 200 senses the position of the transducer 132 relative to a track, via the transducer 132, as a sensed position signal 226 based on, for example, servo patterns along the track. The sensed position signal 226 is fed-back to a summing node 230, where it is combined with a desired reference position signal 232 to generate a position error signal 234. The desired reference position signal 232 is generated by the reference position generator 210, and may be a DC value (e.g., static value), such as zero, for at least a portion of the revolution of the disks 108, which may drive the transducer 132 toward a centerline of a track during track following.

The microactuator compensator 202 is configured to control movement of the microactuator 128 based on the position error signal 234. For example, the microactuator compensator 202 generates a control signal 236 that compensates for high frequency components of the position error signal 234. The microactuator 128 can then effect high frequency movements of the transducer 132 within its range of movement responsive to the control signal 236. The microactuator position estimator 204 estimates the position of the microactuator 128 in its range of movement and generates an estimated microactuator position signal 238. The estimated microactuator position signal 238 is combined at a summing node 240 with the position error signal 234 and provided to the coarse actuator compensator 206 and the adaptive repeatable compensator 208.

The coarse actuator compensator 206 controls movement of the coarse actuator 140, via a coarse actuator control signal 244, based on the estimated microactuator position signal 238 and based on the position error signal 234. Accordingly, the response of the coarse actuator compensator 206 takes into account an estimate of the response of the microactuator 128 to the position error signal 234.

The adaptive repeatable compensator 208 is configured to compensate for RRO based on the estimated microactuator position signal 238 and based on the position error signal 234, and generates a compensation signal 242. The adaptive repeatable compensator 208 may compensate for RRO by, for example, determining RRO for at least one track on the disk, generating the compensation signal 242 based on the determined RRO and the track being followed. Determination of RRO for tracks on a disk is discussed in U.S. Pat. Nos. 6,549,362 and 5,550,685, the disclosures of which are hereby incorporated by reference herein as if set forth in their entirety. The compensation signal 242 is combined with the coarse actuator control signal 244 at a summing node 246, and provided to the coarse actuator 140 to move the transducer 132 so as to compensate for RRO. Accordingly, the adaptive repeatable compensator 208 generates the compensation signal 242 based on a estimation of upcoming RRO for a track and fed-forward the compensation signal 242 to the coarse actuator 140 to compensate for the affects of RRO.

Because the adaptive repeatable compensator 208 can compensate for RRO based on both the estimated microactuator position signal 238 and the position error signal 234, it may be able to more accurately compensate for RRO while the microactuator 128 is in a saturated or unsaturated mode (i.e., commanded beyond its range of movement or within its range of movement). For example, the transfer function of the control loops connected across the input and output nodes 250 and 252 of the adaptive repeatable compensator 208, referred to as a disturbance transfer function (DTF), may be represented by the following equation (1):

$$DTF = \frac{(1 + C_U Kest) * P_V}{(1 + C_U P_U + (1 + Kest * C_U) * C_V P_V)}, \quad (1)$$

where Pu is the actual microactuator 128 plant response function, Kest is the estimated microactuator response function 204, Cu is the response function of the microactuator compensator 202; Pv is the response function for the coarse actuator 140, and Cv is the response function of the coarse-actuator compensator 206.

Inasmuch as (and to the extent that) Kest is defined to match Pu (including nonlinear characteristics), an equality exists between the expressions (1+Cu*Kest) and (1+Cu*Pu).

Equation (1) can then be reduced down to the following equation (2) for the DTF:

$$DTF = \frac{P_V}{(1 + C_V P_V)}. \quad (2)$$

Accordingly, as shown by equation (2), DTF can be independent of whether the microactuator 128 is in a saturated or unsaturated mode. Thus, the adaptive repeatable compensator 208 may be able to more accurately compensate for RRO while the microactuator 128 moves between saturated and unsaturated states. Moreover, the adaptive repeatable compensator 208 may be designed with a uniform set of parameters that may be independent of whether the microactuator 128 is in a saturated mode or unsaturated mode.

Figure 3:
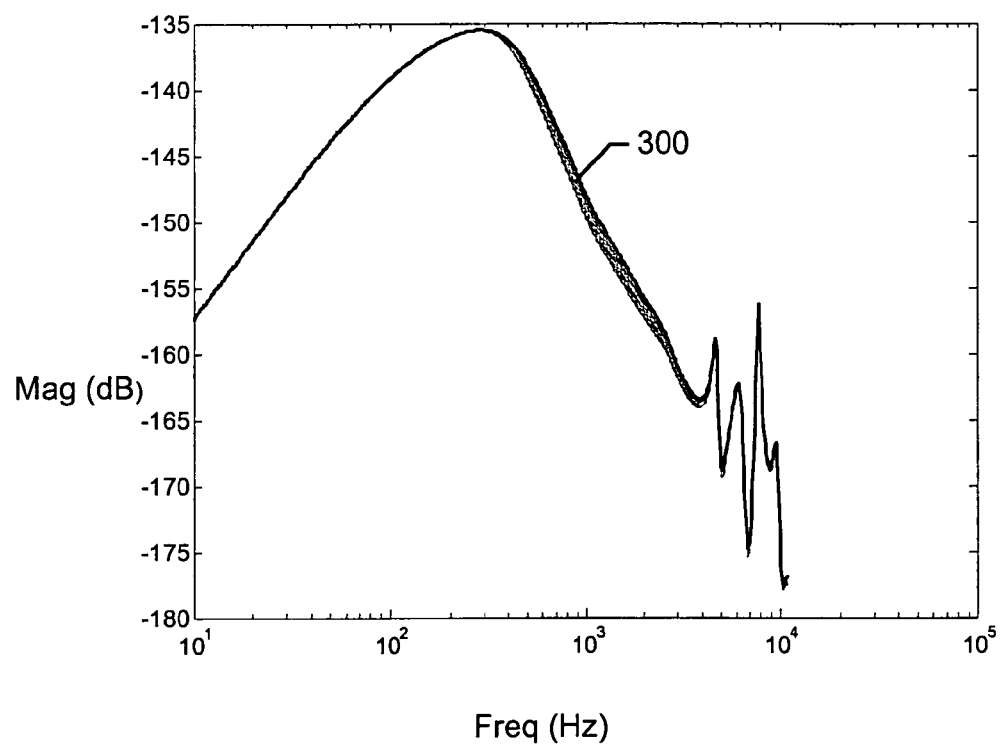
FIG. 3 is a graph illustrating results of a simulation of the disturbance transfer function associated with the adaptive repeatable compensator of FIG. 2 based on a range of error in the estimate of the microactuator position, according to some embodiments of the present invention.

With reference now to FIG. 3, a graph 300 is shown that represents results of a simulation of the effect on DTF as an error in the estimated microactuator position signal 238 (i.e., a difference between the actual and estimated microactuator position) varies between −0.1 and 0.1. As shown in FIG. 3, the DTF response is relatively unaffected by such error in the estimated microactuator position signal 238.

Figure 4:
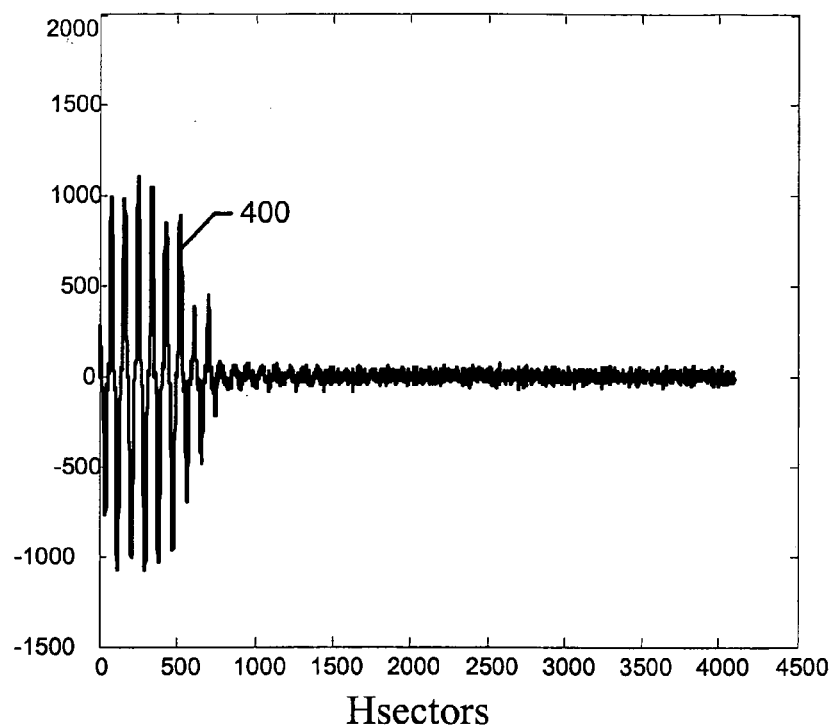
FIG. 4 is a graph illustrating results of a simulation of the position error signal of FIG. 2 as the microactuator is controlled in a saturated mode and then in an unsaturated mode, according to some embodiments of the present invention.
Figure 5:
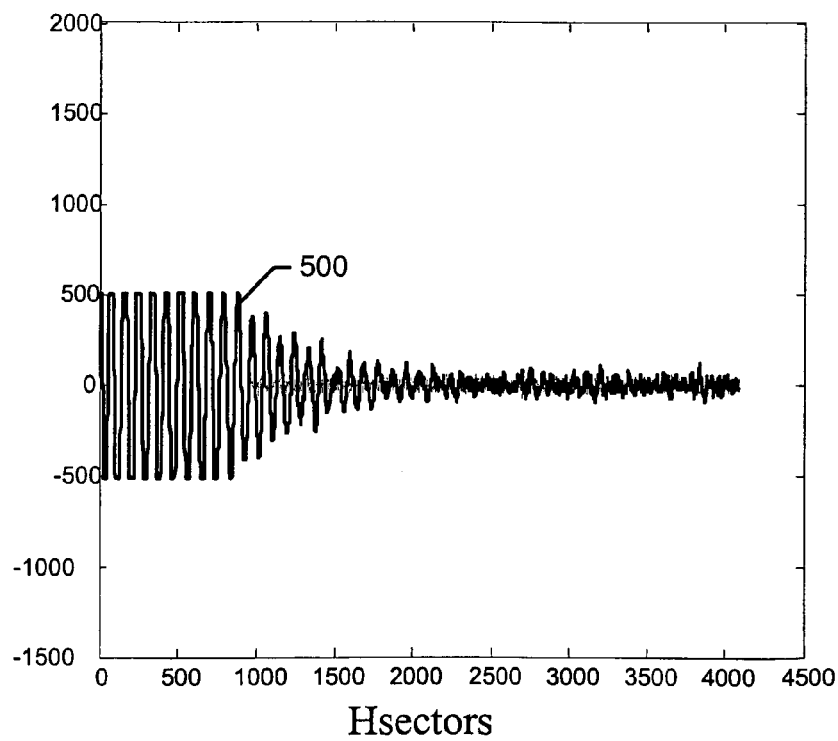
FIG. 5 is a graph illustrating results of a simulation of the position of the microactuator of FIG. 2 as it is controlled in a saturated mode and then in an unsaturated mode, according to some embodiments of the present invention.

Referring now to FIGS. 4 and 5, graphs 400 and 500 represent the results of a simulation of the position error signal 234 and the microactuator position 220, respectively. As shown by the graph 500 of movement of the microactuator 128 (along Y-axis), the microactuator 128 is in a saturated mode between 0 and about 700 servo sectors ("Hsectors" along X-axis) along a track and then changes to an unsaturated mode thereafter. In the corresponding graph 400, the position error signal 234 is shown to quickly converge toward zero while the microactuator 128 is in the saturated mode, and is relatively unaffected when the microactuator 128 changes from the saturated mode to the unsaturated mode. Accordingly, the ability of the controller 200 to compensate for RRO while positioning the transducer 132 relative to a track can be relatively unaffected by whether the microactuator 128 is in a saturated mode, unsaturated mode, or changing therebetween.

Figure 6:
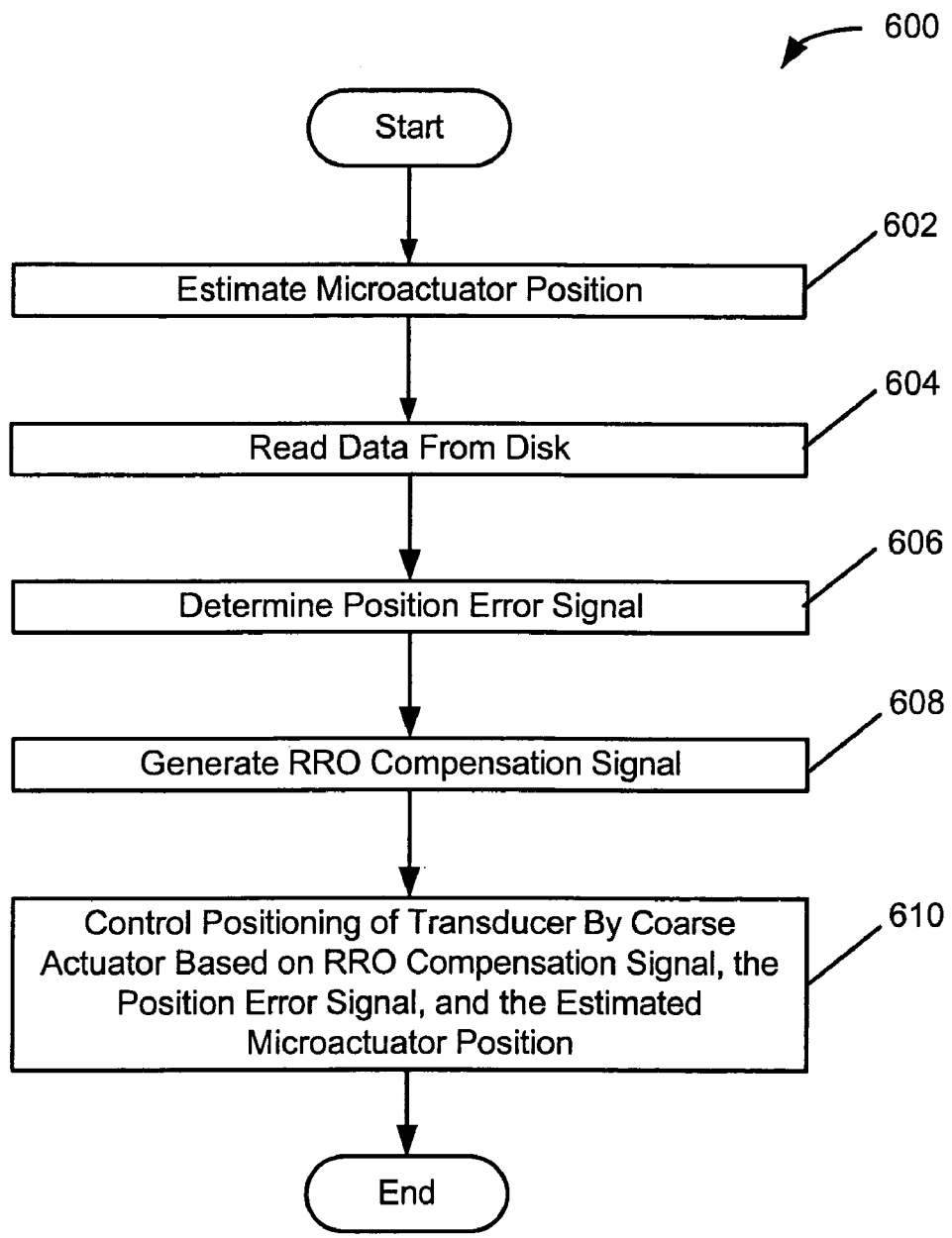
FIG. 6 is a flowchart illustrating operations for compensating for RRO in a multi-actuator disk drive according to some embodiments of the present invention.

Referring now to FIG. 6, a flowchart of operations 600 is shown for compensating for RRO in a multi-actuator disk drive, such as the disk drive 100 shown in FIG. 1. Accordingly, the operations 600 may be carried out by the controllers 144 and/or 200 shown in FIGS. 1 and 2. At Block 602, the position of the microactuator in its range of movement is estimated. At Block 604, data is read from a disk via a transducer. The read data may be servo bursts on the disk, such that at Block 606 a position of the transducer relative to a track can be determined and compared to a reference position signal to determine a position error signal therefrom. At Block 608, a RRO compensation signal is generated by, for example, determining RRO for at least one track on the disk and feeding forward the determined RRO as the RRO compensation signal, such as described above. At Block 610, positioning of the transducer is controlled by a coarse actuator based on the RRO compensation signal, the position error signal, and the estimated microactuator position.

For purposes of illustration only, the actuators 128 and 140 have been referred to above as a microactuator and a coarse actuator, respectively, in accordance with some embodiments of the present invention. However, it is to be understood that the present invention is not limited to use with microactuators and coarse actuators. Instead, the controllers 144 and 200 of FIGS. 1 and 2 can be configured to control a primary actuator and a secondary actuator, such that actuator 140 can be referred to as a primary actuator and the actuator 128 can be referred to as a secondary actuator. The primary actuator can have a greater range of movement than the secondary actuator, but may have a lower frequency response to control commands. Moreover, although the foregoing discussion has been in the context of a disk drive having two actuators, the present invention is not so limited to such embodiments. Instead, the present invention may be applied to any disk drive system having more than one actuator.

The foregoing discussion of the invention has been presented for purposes of illustration and description. Further, the description is not intended to limit the invention to the form disclosed herein. Consequently, variations and modifications commensurate with the above teachings are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments.

What is claimed is:

1. A method of compensating for repeatable runout in a disk drive having a data storage disk, a transducer adjacent to the disk, a primary actuator for positioning the transducer over a first range of movement, and a secondary actuator for positioning the transducer over a second range of movement that is less than the first range of movement, the method comprising:
    estimating a position of the secondary actuator in the second range of movement;
    reading data from the disk via the transducer;
    determining a position error signal based on the read data;
    determining repeatable runout for at least one track on the disk;
    generating a repeatable runout compensation signal based on the determined repeatable runout; and
    controlling positioning of the transducer by the primary actuator based on the repeatable runout compensation signal, based on the position error signal, and based on the estimated position of the secondary actuator in the second range of movement to compensate for repeatable runout.

2. The method of claim 1, further comprising controlling positioning of the transducer by the secondary actuator based on the position error signal.

3. A disk drive comprising:
    a data storage disk;
    a transducer configured to read data from the disk;
    a primary actuator that is configured to position the transducer relative to the disk over a first range of movement;
    a secondary actuator that is configured to position the transducer over a second range of movement that is less than the first range of movement; and
    a controller that is configured to control positioning of the transducer by the primary actuator and the secondary actuator, to estimate position of the secondary actuator in the second range of movement, to determine a position error signal based on data read by the transducer, to determine repeatable runout for at least one track on the disk, to generate a repeatable runout compensation signal based on the determined repeatable runout, and to control positioning of the transducer by the primary actuator based on the repeatable runout compensation signal, based on the position error signal, and based on the estimated position of the secondary actuator in the second range of movement to compensate for repeatable runout.

4. The disk drive of claim 3, wherein:
    the primary actuator is configured to coarsely position the transducer; and
    the secondary actuator is configured to finely position the transducer.

5. The disk drive of claim 4, wherein:
    the primary actuator comprises a voice coil motor; and
    the secondary actuator comprises a microactuator.

6. The disk drive of claim 3, wherein the controller is configured to control positioning of the transducer by the secondary actuator based on the position error signal.

7. A disk drive comprising:
    a data storage disk;
    a transducer configured to read data from the disk;
    a primary actuator that is configured to position the transducer relative to the disk over a first range of movement;
    a secondary actuator that is configured to position the transducer over a second range of movement that is less than the first range of movement; and
    a controller that is configured to control positioning of the transducer by the primary actuator and the secondary actuator, to estimate position of the secondary actuator in the second range of movement, to determine a position error signal based on data read by the transducer, and to control positioning of the transducer by the primary actuator based on the estimated position of the secondary actuator in the second range of movement and based on the position error signal to compensate for repeatable runout, wherein the controller comprises:
    a primary compensator that is configured to control movement of the transducer by the primary actuator;
    a secondary compensator that is configured to control movement of the transducer by the secondary actuator;
    a secondary actuator position estimator that is configured to estimate position of the secondary actuator in the second range of movement; and
    an adaptive repeatable compensator that is configured to compensate for repeatable runout based on the position error signal and based on the estimated position of the secondary actuator in the second range of movement.

8. The disk drive of claim 7, wherein the adaptive repeatable compensator is configured to determine repeatable runout for at least one track on the disk, configured to generate a repeatable runout compensation signal based on the determined repeatable runout, and configured to control positioning of the transducer by the primary actuator based on the repeatable runout compensation signal, based on the position error signal, and based on the estimated position of the secondary actuator in the second range of movement.

9. A disk drive comprising:
    a data storage disk;
    a transducer configured to read data from the disk;
    a primary actuator that is configured to position the transducer relative to the disk over a first range of movement;

a secondary actuator that is configured to position the transducer over a second range of movement that is less than the first range of movement;

a base, wherein the disk is rotatable mounted to the base;

an actuator arm comprising first and second members, wherein the first member is connected between the base and the second member, wherein the transducer is coupled to the second member, wherein the primary actuator is configured to move the first member relative to the base, and wherein the secondary actuator is configured to move the second member relative to the first member;

a controller that is configured to control positioning of the transducer by the primary actuator and the secondary actuator, to estimate position of the secondary actuator in the second range of movement, to determine a position error signal based on data read by the transducer, and to control positioning of the transducer by the primary actuator based on the estimated position of the secondary actuator in the second range of movement and based on the position error signal to compensate for repeatable runout, wherein the controller comprises:

a primary compensator that is configured to control movement of the first member by the primary actuator;

a secondary compensator that is configured to control movement of the second member by the secondary actuator;

a secondary actuator position estimator that is configured to estimate position of the second member relative to the first member; and an adaptive repeatable compensator that is configured to compensate for repeatable runout based on the estimated position of the second member relative to the first member and based on the position error signal.

10. A computer program product for compensating for repeatable runout in a disk drive having a data storage disk, a transducer adjacent to the disk, a primary actuator for positioning the transducer over a first range of movement, and a secondary actuator for positioning the transducer over a second range of movement that is less than the first range of movement, the computer program product comprising computer program code embodied in a tangible computer-readable storage medium, the computer program code comprising:

computer program code that is configured to estimate a position of the secondary actuator in the second range of movement;

computer program code that is configured to determine repeatable runout for at least one track on the disk;

computer program code that is configured to generate a repeatable runout compensation signal based on the determined repeatable runout; and computer program code that is configured to control positioning of the transducer by the primary actuator based on the repeatable runout compensation signal, based on the position error signal, and based on the estimated position of the secondary actuator in the second range of movement to compensate for repeatable runout.

11. The computer program product of claim 10, further comprising computer program code that is configured to control positioning of the transducer by the secondary actuator based on the position error signal.

* * * * *